United States Patent [19]
Sakai et al.

[11] Patent Number: 5,815,621
[45] Date of Patent: Sep. 29, 1998

[54] OPTICAL FIBER CONNECTOR FERRULE WITH DIE AND METHOD OF MANUFACTURING SAME

[75] Inventors: Kazuaki Sakai; Hidetoshi Ishida; Toshiaki Kakii, all of Yokohama, Japan

[73] Assignee: Sumitomo Electric Industries, Ltd., Osaka, Japan

[21] Appl. No.: 802,173

[22] Filed: Feb. 18, 1997

[30] Foreign Application Priority Data

| May 23, 1996 | [JP] | Japan | 7-128720 |
| May 30, 1996 | [JP] | Japan | 7-157452 |
| Jun. 7, 1996 | [JP] | Japan | 7-166611 |
| Jul. 4, 1996 | [JP] | Japan | 7-192748 |

[51] Int. Cl.$^6$ ............ G02B 6/36; B24D 11/00
[52] U.S. Cl. ............ 385/80; 385/14; 385/59; 385/60; 385/70; 385/71; 385/77; 385/78; 385/82; 385/64; 264/1.1; 264/1.24; 264/1.29; 264/1.25
[58] Field of Search ............ 385/14, 24, 31, 385/39, 54, 55, 59, 60, 64, 70, 71, 72, 76, 77, 78, 80, 82, 99, 114, 115; 264/1.1, 1.24, 1.25, 1.29, 1.7, 2.7

[56] References Cited

U.S. PATENT DOCUMENTS

| 4,818,059 | 4/1989 | Kakii et al. | 385/80 X |
| 4,830,456 | 5/1989 | Kakii et al. | 385/80 X |
| 4,950,048 | 8/1990 | Kakii et al. | 385/80 X |
| 4,952,263 | 8/1990 | Kakii et al. | 156/153 |
| 5,377,286 | 12/1994 | Iida et al. | 385/33 |
| 5,394,495 | 2/1995 | Booth et al. | 385/59 |
| 5,416,868 | 5/1995 | Kakii et al. | 385/80 |
| 5,420,952 | 5/1995 | Katsura et al. | 385/80 |
| 5,422,971 | 6/1995 | Honjo et al. | 385/80 |
| 5,519,799 | 5/1996 | Murakami et al. | 385/78 |
| 5,548,675 | 8/1996 | Shigematsu et al. | 385/80 |
| 5,583,958 | 12/1996 | Yanagawa et al. | 385/24 |
| 5,611,010 | 3/1997 | Shiino et al. | 385/53 |

FOREIGN PATENT DOCUMENTS

| 3-291606 | 12/1991 | Japan | 385/80 X |
| 5-60949 | 3/1993 | Japan | 385/80 X |

*Primary Examiner*—Brian Healy
*Attorney, Agent, or Firm*—Cushman Darby & Cushman IP Group of Pillsbury Madison & Sutro LLP

[57] ABSTRACT

An optical connector ferrule of this invention includes a holding portion arranged at a position along an inserting direction of optical fibers to constitute a front surface of the ferrule and having a plurality of first through holes for inserting the optical fibers therethrough and two second through holes for inserting guide pins, the holding portion holding portions of the optical fibers near distal ends thereof, the second through holes and the first through holes having central axes that are substantially parallel to each other, and the first through holes being arrayed in two rows in a direction connecting centers of the second through holes; and an optical fiber tape accommodating portion having an insertion opening for inserting therethrough optical fiber tapes having the optical fibers held by the holding portion, an internal space for partially accommodating the optical fiber tapes, and an injection opening for injecting therethrough an adhesive for adhering and fixing the inserted optical fiber tapes and the ferrule with each other. The optical connector ferrule is formed integrally by resin molding. When optical fiber tapes are inserted in this ferrule to be stacked in two layers and the ferrule and the optical fiber tapes are adhered and fixed to each other.

27 Claims, 23 Drawing Sheets

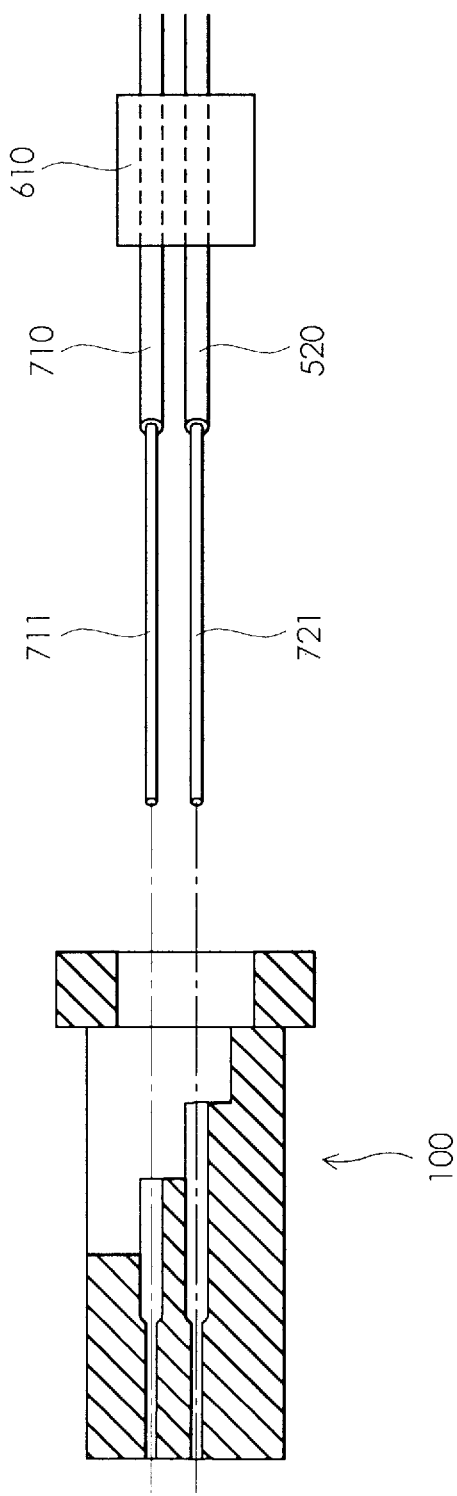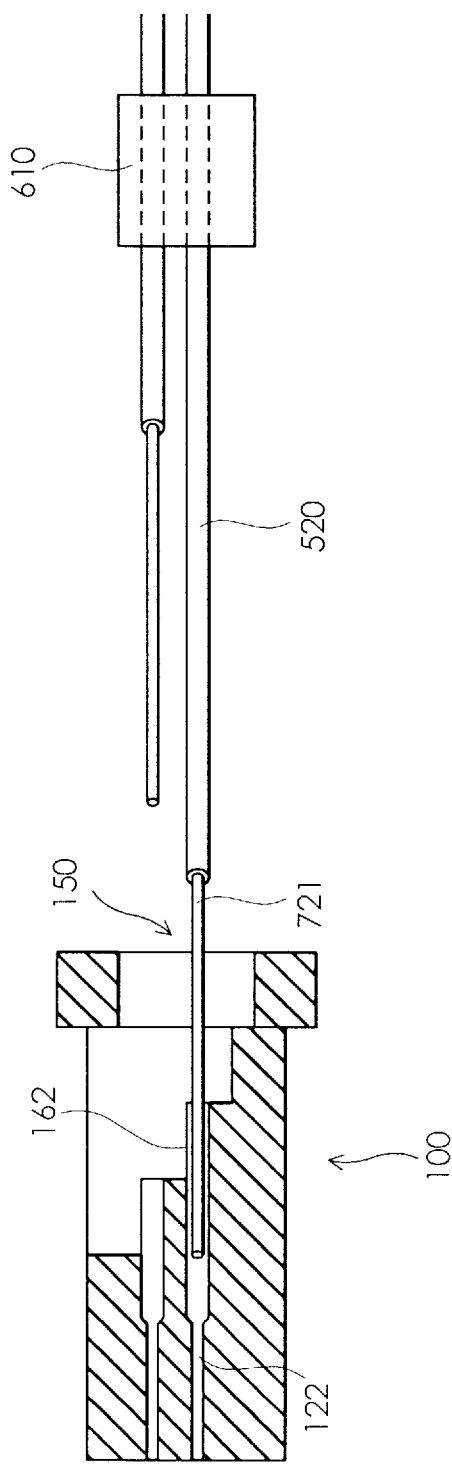

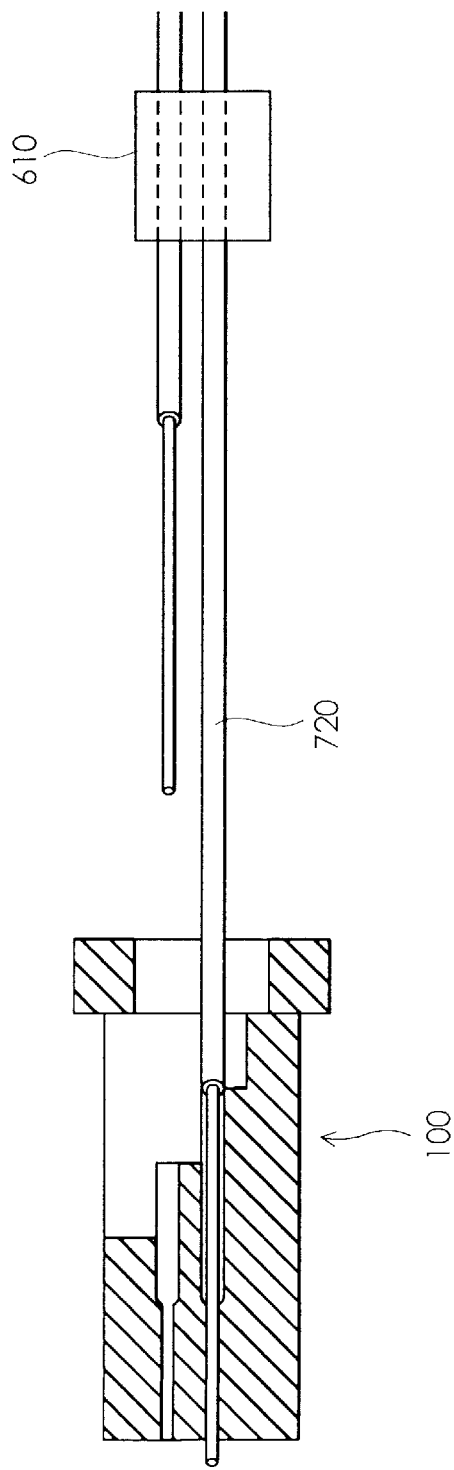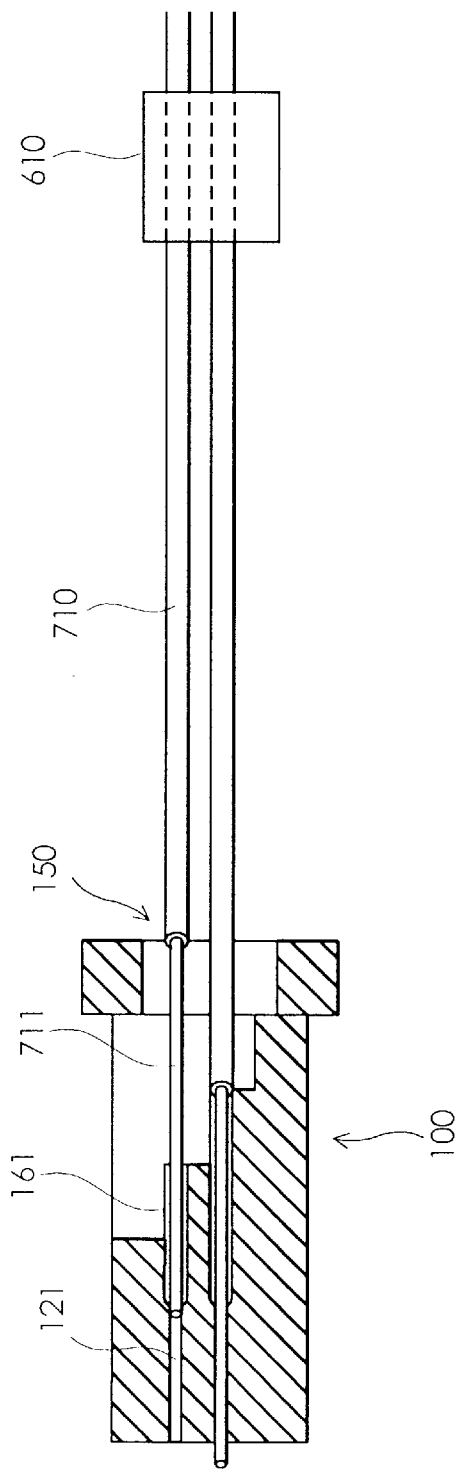

OPTICAL FIBER CONNECTOR FERRULE WITH DIE AND METHOD OF MANUFACTURING SAME

BACKGROUND OF THE INVENTION

1. Field of the Invention

The present invention relates to an optical connector ferrule utilized by an optical connector that optically connects optical fibers, and an optical connector with optical fibers which utilizes this optical connector ferrule. More specifically, the present invention relates to a die for manufacturing this optical connector ferrule and an optical connector ferrule manufacturing method of manufacturing this optical connector ferrule by utilizing this die.

2. Related Background Art

According to a conventional optical connector ferrule manufacturing method, as disclosed in, e.g., Japanese Patent Laid-Open No. 3-291606, a plastic is injected and solidified in the cavity of a die sandwiching core pins used for forming optical fiber insertion through holes, thereby obtaining an optical connector.

In the optical connector ferrule manufactured with this conventional manufacturing method, the optical fiber insertion through holes are arrayed one-dimensionally. Accordingly, in an optical connector with optical fibers which is manufactured by utilizing this optical connector ferrule, the optical fibers on the end face of the optical connector are arrayed one-dimensionally.

SUMMARY OF THE INVENTION

It is an object of the present invention to obtain an optical connector ferrule which is an indispensable component for a connector with optical fibers in which the array density of the optical fibers is increased. It is the final object of the present invention to provide an optical connector with optical fibers in which the array density of the optical fibers is increased.

According to the first aspect of the present invention, there is provided an optical connector ferrule comprising: a holding portion arranged at a position along an inserting direction of optical fibers to constitute a front surface of the ferrule and having a plurality of first through holes for inserting the optical fibers therethrough and two second through holes for inserting guide pins, the holding portion holding portions of the optical fibers near distal ends thereof, the second through holes and the first through holes having central axes that are substantially parallel to each other, and the first through holes being arrayed in two rows in a direction connecting centers of the second through holes; and an optical fiber tape accommodating portion having an insertion opening for inserting therethrough optical fiber tapes having the optical fibers held by the holding portion, an internal space for partially accommodating the optical fiber tapes, and an injection opening for injecting therethrough an adhesive for adhering and fixing the inserted optical fiber tapes and the ferrule with each other, wherein the optical connector ferrule is formed integrally by resin molding.

When optical fiber tapes having the distal end portions from which the coatings are removed are inserted in this ferrule and the ferrule and the optical fibers are fixed to each other with an adhesive, an optical connector with optical fibers according to the second aspect of the present invention is manufactured.

More specifically, according to the second aspect of the present invention, there is provided an optical connector with optical fibers, comprising: the optical connector ferrule described above; a first optical fiber tape having a bare optical fiber portion at a distal end portion thereof which is held by the first through holes of the first row of the holding portion of the ferrule, the first optical fiber tape being adhered and fixed to the ferrule in the internal space of the optical fiber tape accommodating portion of the ferrule; and a second optical fiber tape having a bare optical fiber portion at a distal end portion thereof which is held by the first through holes of the second row of the holding portion of the ferrule, the second optical fiber tape being adhered and fixed to the ferrule in the internal space of the optical fiber tape accommodating portion of the ferrule.

In this optical connector, since the optical splicing end faces of the optical fibers are arranged in two rows when seen from the end face of the ferrule, the array density of the optical fibers is increased.

It is preferable that an optical connector according to the present invention further comprise, at an insertion opening portion of the ferrule, a member for substantially filling an insertion opening together with the first and second optical fiber tapes.

The insertion opening of the ferrule has a size with a margin for the first and second optical fiber tapes for the sake of easy insertion of the optical fiber tapes in assembly of the optical connector. If, however, the insertion opening has a size with a margin, when an adhesive is injected into the optical fiber tape accommodating portion of the ferrule through the injection opening in order to adhere and fix the ferrule and the first and second optical fiber tapes with each other, the adhesive leaks from the insertion opening. In particular, if the adhesive leaks and solidifies between the first and second optical fiber tapes, the first and second optical fiber tapes are partly fixed by adhesion outside the ferrule. As a result, the degree of freedom of the optical fiber tapes outside the ferrule is lost.

For this reason, if the optical connector further comprises a member for substantially filling the insertion opening together with the first and second optical fiber tapes and, after the optical fiber tapes are inserted in the ferrule, if the insertion opening is closed with this filling member and the first and second optical fiber tapes, even when the adhesive is injected into the optical fiber tape accommodating portion of the ferrule through this injection opening, the adhesive will not leak from the insertion opening.

According to the third aspect of the present invention, there is provided a die comprising: an upper die metal block and a lower die metal block respectively having recessed portions formed to have predetermined shapes so as to constitute a cavity for forming an optical connector ferrule when major surfaces of the upper and lower die metal blocks are brought into tight contact with each other to sandwich upper core-pins and lower core pins arrayed in two rows to form first through holes for optical fiber insertion, a spacer arranged between the rows of the upper and lower core pins, and two guide hole formation pins for forming second through holes for guide pin insertion, the rows of the upper and lower core pins being arrayed between the two guide hole formation pins when the cavity for forming the optical connector ferrule is constituted, wherein the upper die metal block has a first positioning mechanism portion for positioning the upper core pins and a second positioning mechanism portion for positioning an upper side of the guide hole formation pins, and the lower die metal block has a third positioning mechanism portion for positioning the lower core pins and a fourth positioning mechanism portion for positioning a lower side of the guide hole formation pins.

It is preferable that the die further comprise: an upper die body having a recessed portion to accommodate the upper die metal block, and a lower die body having a recessed portion to accommodate the lower die metal block, so that (i) when the upper die metal block is placed on a central portion of a bottom surface of the recessed portion of the upper die body such that a bottom surface thereof comes into tight contact with the bottom surface of the recessed portion of the upper die body, a distance between a side surface of the recessed portion of the upper die body and a side surface of the upper die metal block which opposes the side surface of the recessed portion of the upper die body is set to 5 μm to 200 μm, or (ii) when the lower die metal block is placed on a central portion of a bottom portion of the recessed portion of the lower die body such that a bottom surface thereof comes into tight contact with the bottom surface of the recessed portion of the lower die body, a distance between a side surface of the recessed portion of the lower die body and a side surface of the lower die metal block which opposes the side surface of the recessed portion of the lower die body is set 5 μm to 200 μm, so that when the metal blocks accommodated in the respective die bodies are stacked, they float from each other. If the metal blocks float from each other, the opposing positioning mechanism portions of the upper and lower die metal blocks can be aligned highly precisely.

By utilizing this die, the optical connector ferrule according to the first aspect of the present invention is manufactured in accordance with the optical connector ferrule manufacturing method according to the third aspect of the present invention in the following manner.

First, the lower core pins are supported each at two points by the first positioning mechanism portion of the lower die metal block accommodated in the recessed portion of the lower die body, and the guide hole formation pins are supported by the second positioning mechanism portion of the lower die metal block (first step). The upper core pins, the lower core pins, and the guide hole formation pins are held by a pin holding member.

The spacer is inserted between the row of the upper core pins and the row of the lower core pins (second step).

The upper die body accommodating the upper die metal block in its recessed portion is placed on the lower die body, the upper core pins are supported, each at two points, by the third positioning mechanism portion of the upper die metal block, and the guide hole formation pins are supported by the fourth positioning mechanism portion of the upper die metal block (third step).

Successively, a major surface of the upper die metal block and a major surface of the lower die metal block are brought into tight contact with each other, and the upper die body and the lower die body are fixed (fourth step).

A resin is injected into a cavity formed by the recessed portion of the upper die metal block and the recessed portion of the lower die metal block, thereby resin-molding the ferrule (fifth step).

After the resin injected in the cavity solidifies, the upper core pins, the lower core pins, the guide hole formation pins, and the spacer are extracted (sixth step).

Finally, the upper and lower die bodies are separated from each other, and the upper and lower die metal blocks are separated from each other, thereby obtaining an optical connector ferrule which is resin-molded (seventh step).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 29 to 37 are views for explaining the steps in manufacturing the optical connector shown in FIG. 25.

DESCRIPTION OF THE PREFERRED EMBODIMENT

Figure 1:
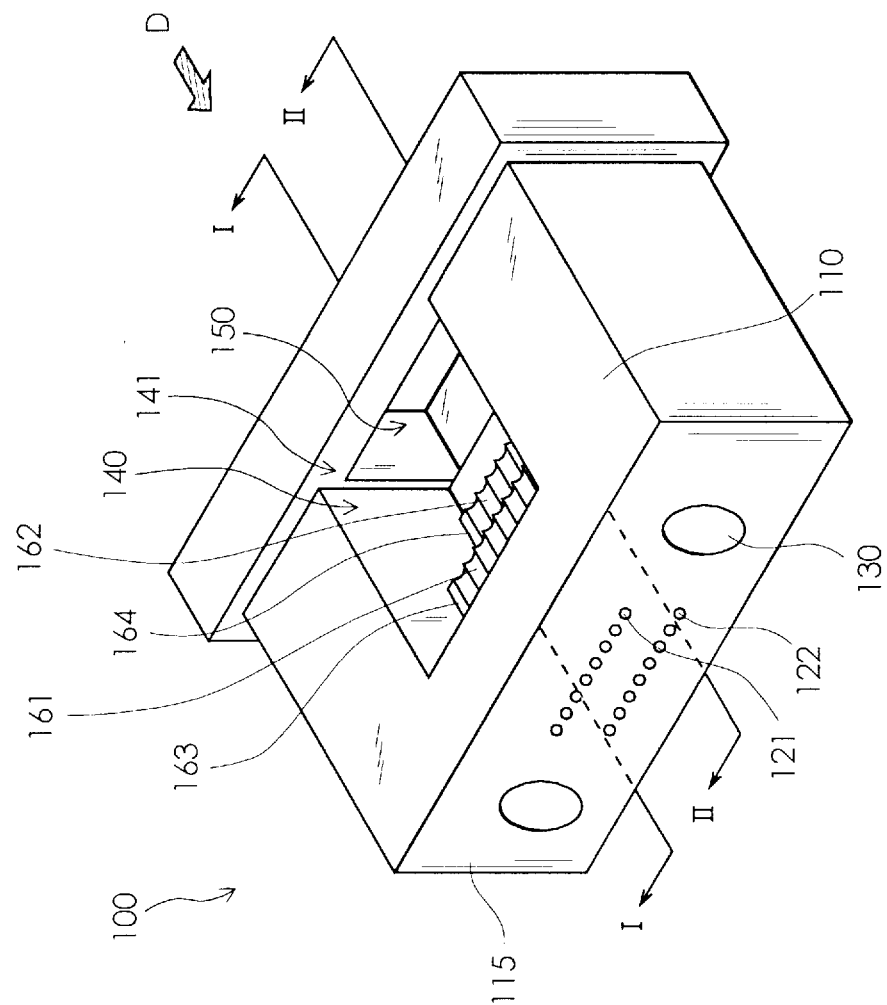
FIG. 1 is a perspective view showing the outer appearance of the structure of an optical connector ferrule 100 according to an embodiment of the present invention.

The embodiment of the present invention will be described with reference to the accompanying drawings. In the description of the drawings, the same elements are denoted by the same reference numerals to avoid a repetitive description.

Figure 2:
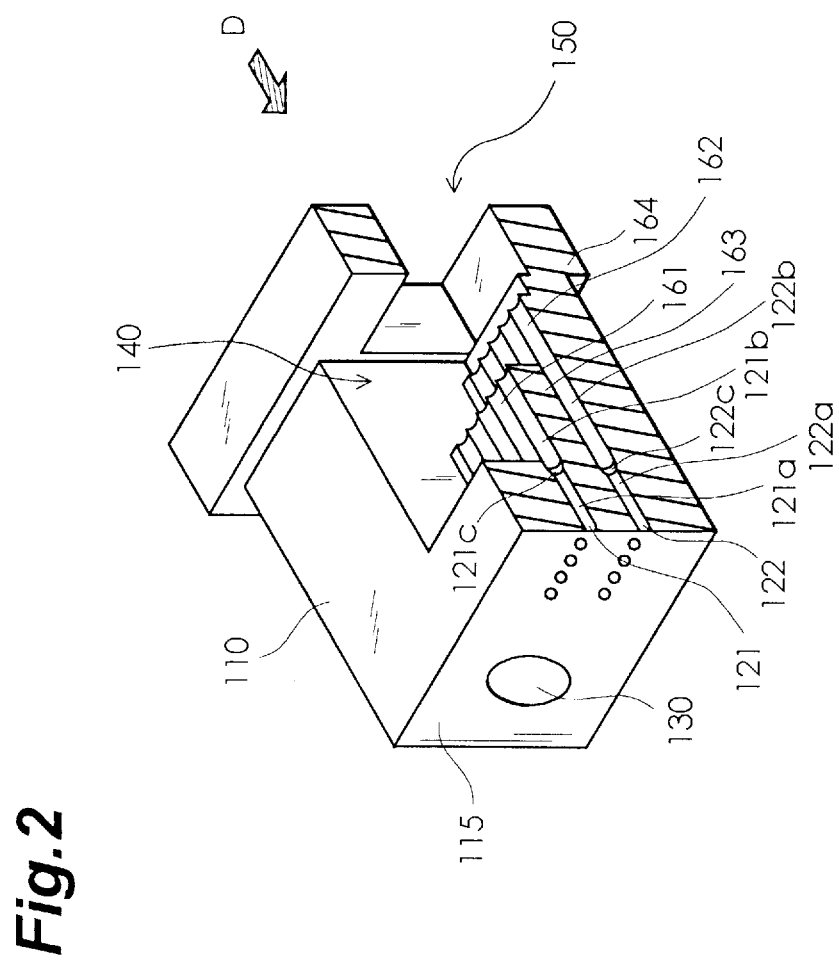
FIG. 2 is a sectional perspective view of the ferrule 100 shown in FIG. 1 taken along the line I—I thereof.
Figure 3:
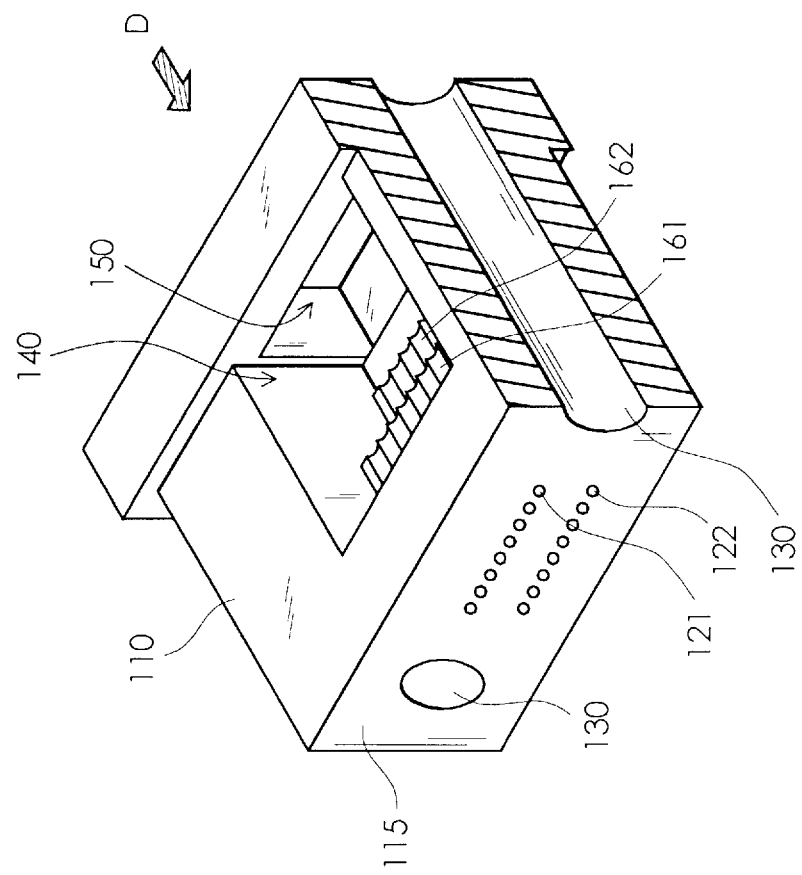
FIG. 3 is a sectional perspective view of the ferrule 100 shown in FIG. 1 taken along the line II—II thereof.

FIGS. 1 to 3 show the structure of an optical connector ferrule 100 of the present invention, in which FIG. 1 is a perspective view showing the outer appearance of the structure of this optical connector ferrule 100, FIG. 2 is a sectional perspective view of the optical connector ferrule 100 shown in FIG. 1 taken along the line I—I thereof, and FIG. 3 is a sectional perspective view of the optical connector ferrule 100 shown in FIG. 1 taken along the line II—II thereof.

As shown in FIG. 1, this ferrule 100 is a ferrule formed integrally by resin molding, and includes a holding portion 110 and an optical fiber tape accommodating portion 140. The holding portion 110 is arranged at a position along an optical fiber inserting direction D to constitute the front surface of the ferrule 100, and has through holes 121 and 122 and two through holes 130 (diameter=0.7 mm). The optical fiber tape accommodating portion 140 has an insertion opening 150 and an injection opening 141. Optical fibers are inserted through the through holes 121 and 122. Guide pins are inserted in the two through holes 130. Optical fiber tapes having optical fibers which are to be held by the holding portion 110 are inserted through the insertion opening 150. The injection opening 141 partially accommodates the optical fiber tapes. An adhesive for fixing by adhesion the inserted optical fiber tapes and the ferrule with each other is injected through the injection opening 141.

The holding portion 110 holds portions near the distal ends of the optical fibers. The central axes of the through holes 130 and the central axes of the through holes 121 and 122 are substantially parallel to each other (distance=0.5 mm). Eight through holes 121 and eight through holes 122 are arranged at a pitch of 250 $\mu$m to form two rows in a direction connecting the centers of the through holes 130.

The optical fiber tape accommodating portion 140 includes a base portion 163 having guide grooves 161 communicating with the through holes 121, and a base portion 164 having guide grooves 162 communicating with the through holes 122.

As shown in FIG. 2, each through hole 121 has a small-diameter portion 121*a* with a diameter (e.g., 126 $\mu$m) slightly larger than the optical fiber diameter of 125 $\mu$m, and a large-diameter portion 121*b* with a diameter (=250 $\mu$m) larger than that of the small-diameter portion 121*a*. The small- and large-diameter portions 121*a* and 121*b* communicate with each other through a tapered portion 121*c*.

Each through hole 122 has a small-diameter portion 122*a* with a diameter (e.g., 126 $\mu$m) slightly larger than the optical fiber diameter of 125 $\mu$m, and a large-diameter portion 122*b* with a diameter (=200 $\mu$m) larger than that of the small-diameter portion 122*a*. The small- and large-diameter portions 122*a* and 122*b* communicate with each other through a tapered portion 122*c*.

The guide grooves 161 communicate with the large-diameter portions 121*b*, and the guide grooves 162 communicate with the large-diameter portions 122*b*.

As shown in FIG. 3, the through holes 130 extend through the main body of the ferrule with a substantially constant diameter.

Figure 4:
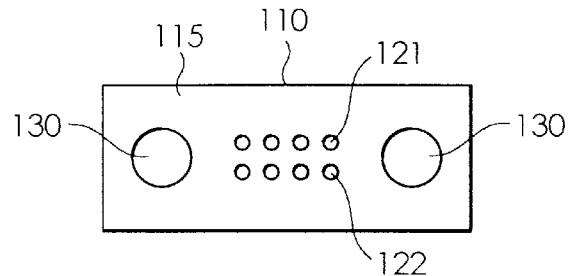
FIGS. 4 to 8 are views for explaining modifications of the array of through holes.
Figure 5:
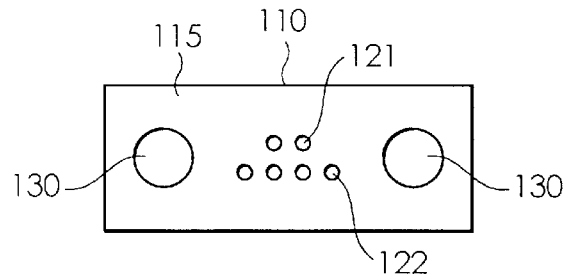
Figure 6:
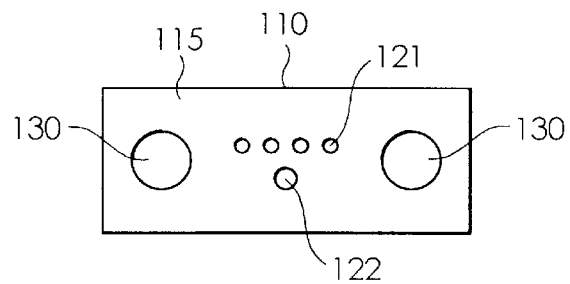
Figure 7:
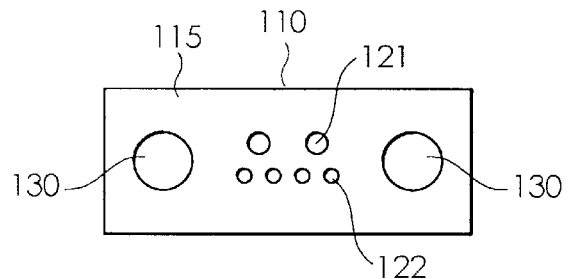
Figure 8:
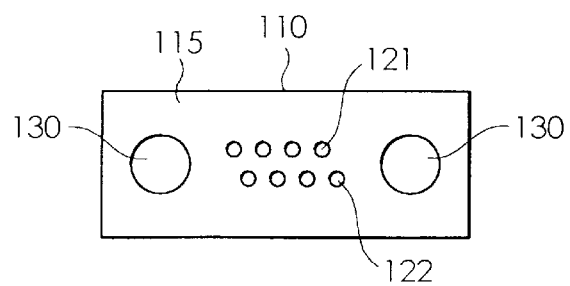

In this embodiment, the eight through holes 121 and the eight through holes 122 are axisymmetrically arrayed in upper and lower two stages. However, the number of through holes 121 or 122 to be arrayed can be other than eight (see FIG. 4), and the number of through holes 121 and the number of arrayed through holes 122 can be different from each other (see FIG. 5). The diameter of the through holes 121 and the diameter of the through holes 122 can be different from each other (see FIGS. 6 and 7). When arraying the through holes 121 and 122 in upper and lower stages, they can be arrayed in a manner other than axisymmetry.

When the number of through holes 121 and the number of through holes 122 arrayed in upper and lower stages are set to be the same and two optical fiber tapes are mounted such that one is used as the main line while the other is used as the spare line, it is preferable that the through holes 121 and 122 be arranged point-symmetrically about the middle point at the center of the two through holes 130. When the through holes 121 and 122 are arranged in this manner, the main line and the spare line can be switched easily by inverting the ferrule upside down.

Figure 9:
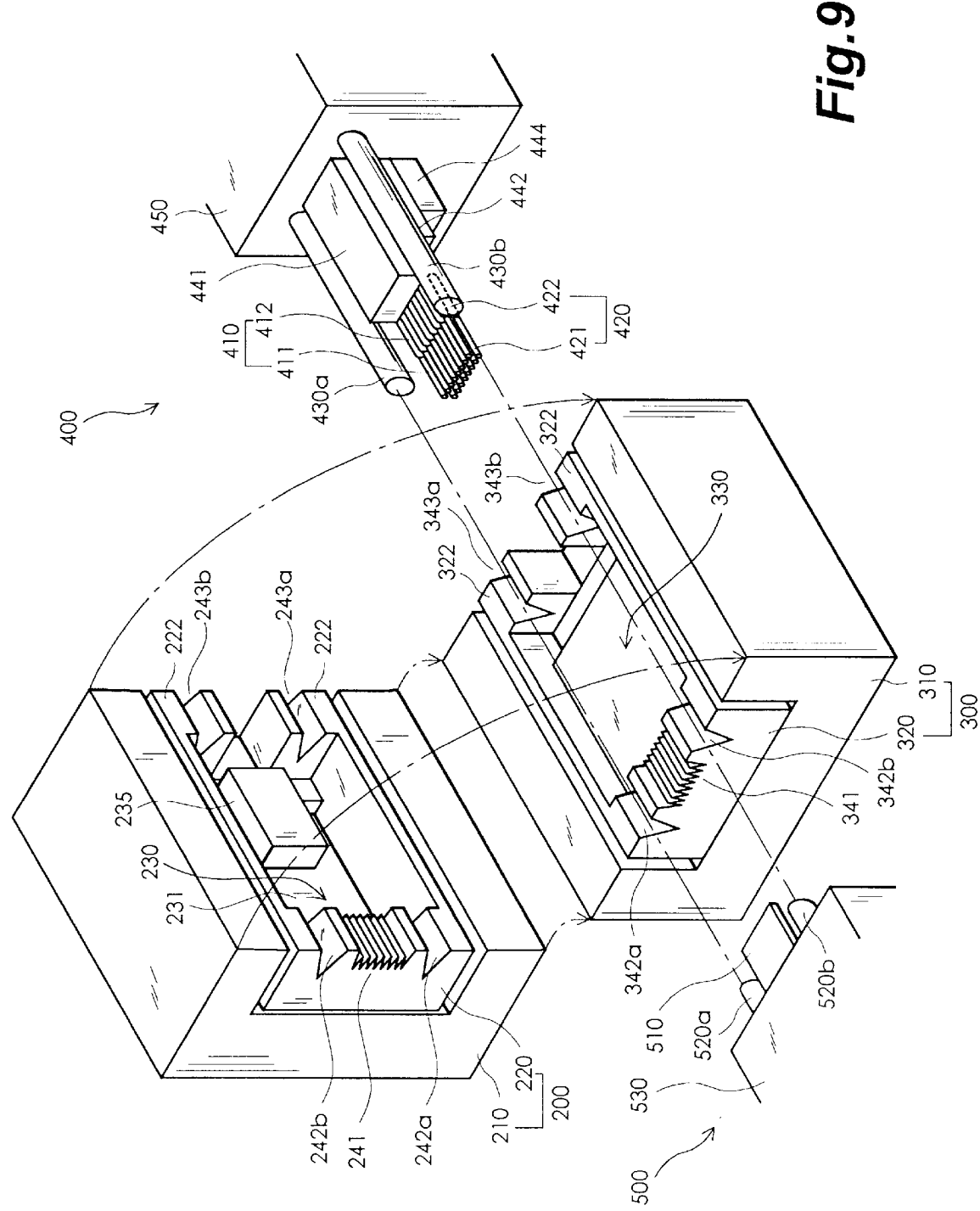
FIG. 9 is a view for explaining a die utilized in the manufacture of the ferrule shown in FIG. 1.

FIGS. 9 to 15 are views for explaining a die used for manufacturing the optical connector ferrule of this embodiment, in which FIG. 9 shows the overall arrangement of this die. As shown in FIG. 9, this die is constituted by an upper portion 200 and a lower portion 300.

Figure 10:
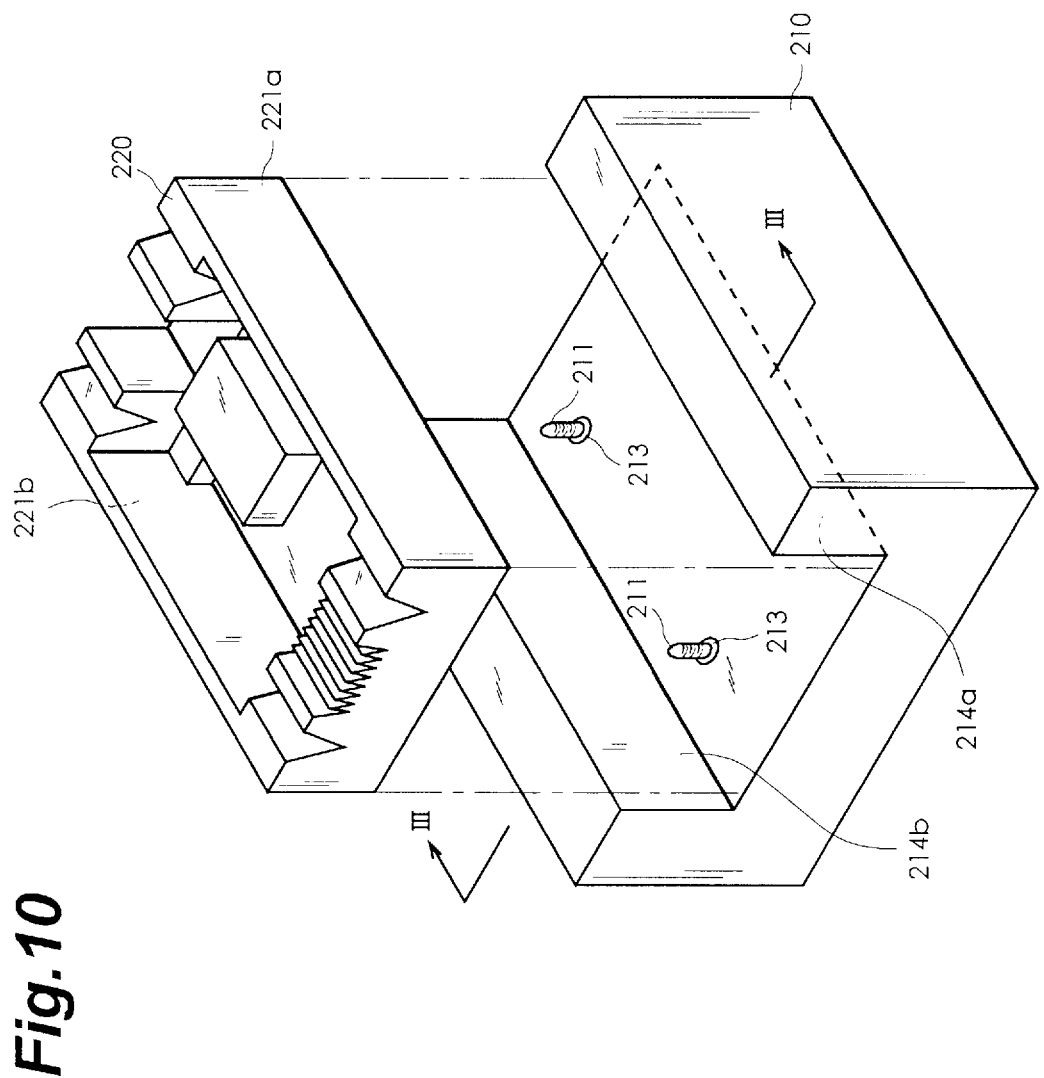
FIGS. 10 and 11 are views for explaining an upper die body 210 and an upper die metal block 220.
Figure 11:
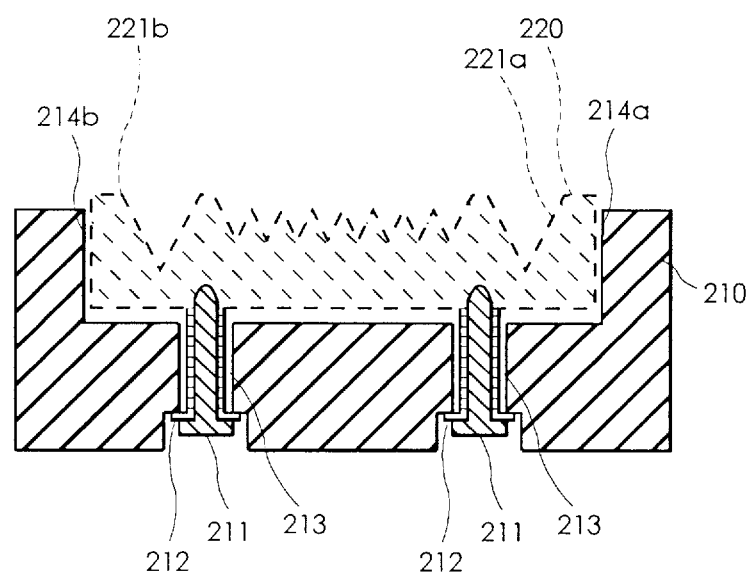

The upper portion 200 has an upper die body 210 and an upper die metal block 220 which is to be accommodated in the recessed portion of the upper die body 210. As shown in FIGS. 10 and 11, the upper die body 210 and the upper die metal block 220 are coupled to each other with screws 211 inserted in pipes 212 extending through through holes 213.

When the upper die metal block 220 is accommodated in the recessed portion of the upper die body 210, side surfaces 214*a* and 214*b* of the recessed portion of the upper die body 210 and side surfaces 221*a* and 221*b* of the upper die metal block 220 opposing the side surfaces 214*a* and 214*b* are spaced apart from each other by a distance of 5 to 200 $\mu$m.

Figure 12:
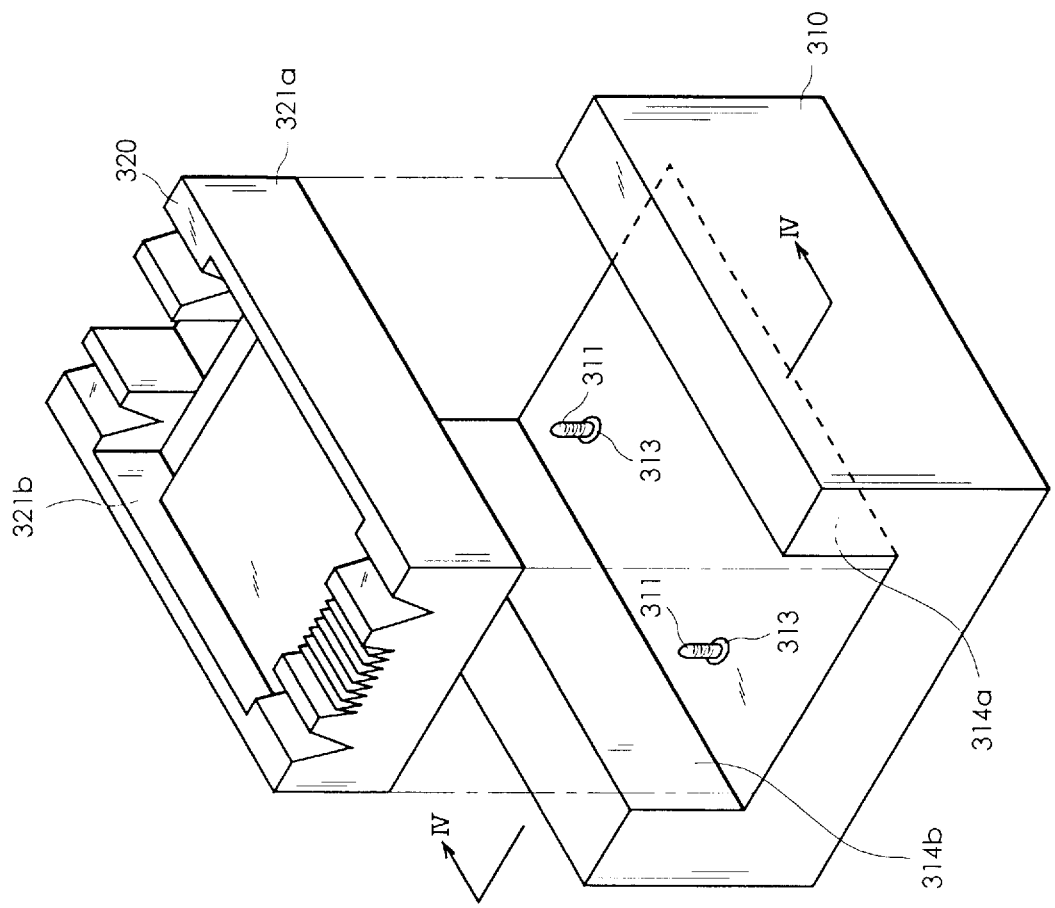
FIGS. 12 and 13 are views for explaining a lower die body 310 and a lower die metal block 320.
Figure 13:
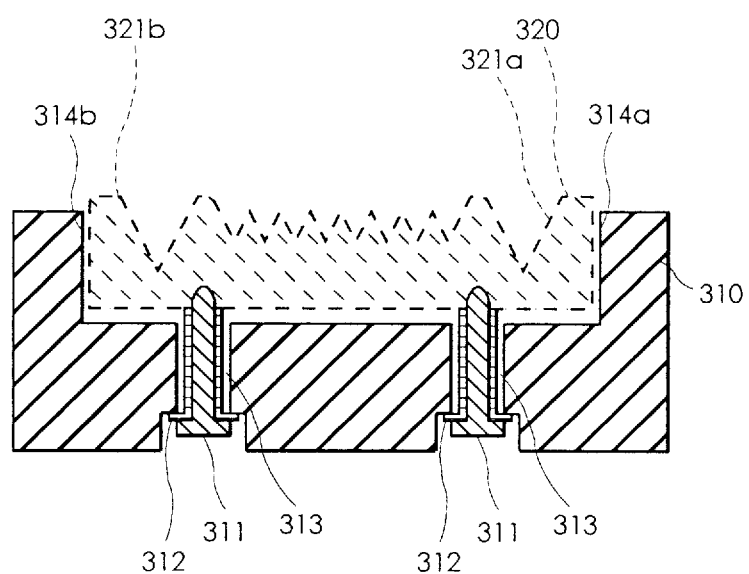

The lower portion 300 has a lower die body 310 and a lower die metal block 320 which is to be accommodated in the recessed portion of the lower die body 310. As shown in FIGS. 12 and 13, the lower die body 310 and the lower die metal block 320 are coupled to each other with screws 311 inserted in pipes 312 extending through through holes 313.

When the lower die metal block 320 is accommodated in the recessed portion of the lower die body 310, side surfaces 314*a* and 314*b* of the recessed portion of the lower die body 310 and side surfaces 321*a* and 321*b* of the lower die metal block 320 opposing the side surfaces 314*a* and 314*b* are spaced apart from each other by a distance of 5 to 200 $\mu$m.

When major surfaces 222 and 322 of the upper and lower die metal blocks 220 and 320 are brought into tight contact with each other such that they sandwich upper core pins 410 and lower core pins 420 arranged in two rows to form the optical fiber insertion through holes 121 and 122, a spacer 510 arranged between the rows of the upper and lower core pins 410 and 420, two guide hole formation pins 430*a* and 430*b* for forming the guide pin insertion through holes 130, and positioning pins 520*a* and 520*b* of the spacer 510, the upper and lower die metal blocks 220 and 320 constitute a cavity for forming the optical connector ferrule 100.

The upper and lower core pins 410 and 420 are prepared in order to form the optical fiber insertion through holes 121 and 122 in the ferrule 100, and the guide hole formation pins 430*a* and 430*b* are prepared in order to form the guide pin insertion through holes 130. Each upper and lower core pin 410, 420 is constituted by a small-diameter portion 411, 421 and a large-diameter portion 412, 422 having a diameter larger than that of the small-diameter portion 411, 421, and the small-diameter portion 411, 421 side of the large-diameter portion 412, 422 is tapered to be coupled to the small-diameter portion 411, 421. This aims at facilitating extraction of the upper and lower core pins 410 and 420 during the manufacture of the ferrule and at enlarging the guide grooves used for initially introducing the distal ends of the optical fibers. The distal end of each of the upper and lower core pins 410 and 420 is tapered. This aims at realizing smooth insertion of the spacer 510 between the rows of the upper and lower core pins 410 and 420 without being caught by the distal ends of the upper and lower core pins 410 and 420.

One end of each of the upper and lower core pins 410 and 420 is held by a corresponding one of holding plates 441 and 442 in order to maintain the pin distance.

The guide hole formation pins 430*a* and 430*b*, the holding plates 441 and 442, and a positioning member 443 are fixed to a fixing member 450 to constitute a through hole formation member 400.

The spacer 510 is inserted between the rows of the upper and lower core pins 410 and 420 to determine the distance between the rows of the upper and lower core pins 410 and 420. As the material of the spacer 510, one having a hardness lower than that of the upper and lower core pins 410 and 420 is selected. For example, the hardness of the material of the spacer 510 can be HRC62, and the hardness of the material of the upper and lower core pins 410 and 420 can be HRC90. This aims at preventing deformation of the upper and lower core pins 410 and 420.

The spacer 510 and the positioning pins 520a and 520b are fixed to a fixing member 530 to constitute a spacing member 500.

The upper die metal block 220 has a positioning mechanism portion 241 for positioning the upper core pins 410, positioning mechanism portions 242a and 242b, and 243a and 243b for positioning the upper side of the guide hole formation pins 430a and 430b, and a recessed portion 230. A bottom surface 231 of the recessed portion 230 has a projecting portion 235 projecting in the vertical direction. Regarding positioning of the upper core pins 410, the positioning mechanism portion 241 employs a V-groove structure for supporting the upper core pins 410 each at two points. Regarding positioning of the upper side of the guide hole formation pins 430a and 430b, the positioning mechanism portions 242a and 242b, and 243a and 243b employ a V-groove structure for supporting the guide hole formation pins 430a and 430b each at two points. Stable positioning and fixing can be realized by three-point supporting obtained by two-point supporting of the V-grooves and one-point supporting of the spacer 510.

The lower die metal block 320 has a positioning mechanism portion 341 for positioning the lower core pins 420, positioning mechanism portions 342a and 342b, and 343a and 343b for positioning the lower side of the guide hole formation pins 430a and 430b, and a recessed portion 330. Regarding positioning of the lower core pins 420, the positioning mechanism portion 341 employs a V-groove structure for supporting the lower core pins 420 each at two points. Regarding positioning of the lower side of the guide hole formation pins 430a and 430b, the positioning mechanism portions 342a and 342b, and 343a and 343b employ a V-groove structure for supporting the guide hole formation pins 430a and 430b each at two points. Stable positioning and fixing can be realized by three-point supporting obtained by two-point supporting of the V-grooves and one-point supporting of the spacer 510.

If the positioning mechanism portion 241 and 341 have the same shape and the positioning mechanism portions 242a and 242b, and 243a and 243b and the positioning mechanism portions 342a and 342b, and 343a and 343b have the same shapes, when the upper and lower metal blocks 220 and 320 are stacked, the opposing positioning mechanism portions can be worked with the same grinding wheel, thus enabling high-precision working within a short period of time.

The optical connector ferrule of this embodiment is manufactured in the following manner by utilizing the die shown in FIGS. 9 to 13.

Figure 14:
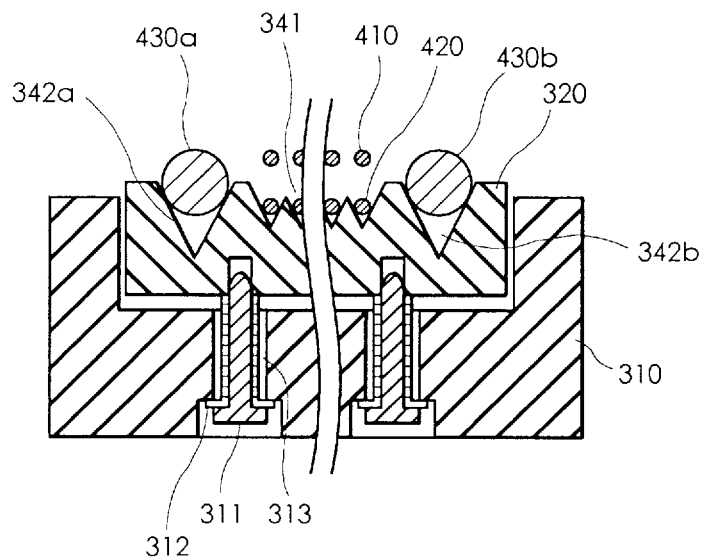
FIGS. 14 to 18 are views for explaining the steps in manufacturing the optical connector ferrule 100 of this embodiment.

The respective lower core pins 420 are supported each at two points by the positioning mechanism portion 341 of the lower die metal block 320 accommodated in the recessed portion of the lower die body 310, and the respective guide hole formation pins 430a and 430b are supported by the positioning mechanism portions 342a and 342b, and 343a and 343b of the lower die metal block 320 (see FIG. 14).

Figure 15:
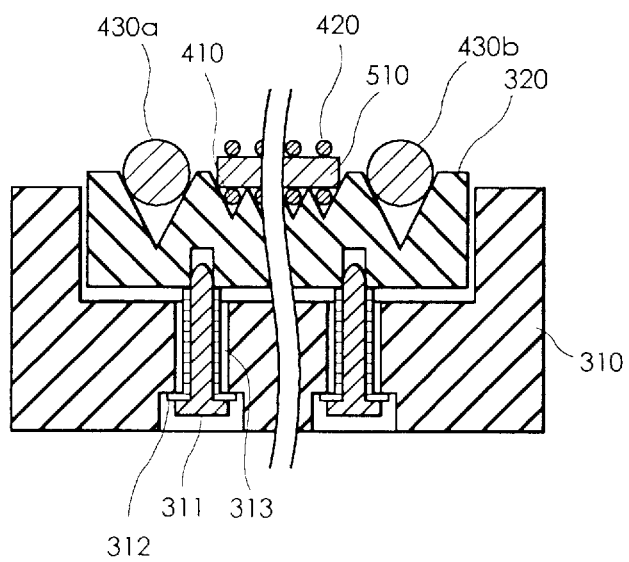

The spacer 510 is inserted between the rows of the upper and lower core pins 410 and 420 (see FIG. 15). At this time, since the positioning pins 520a and 520b are supported each at two points by the positioning mechanism portions 342a and 342b, the position of the spacer 510 is reliably determined.

Figure 16:
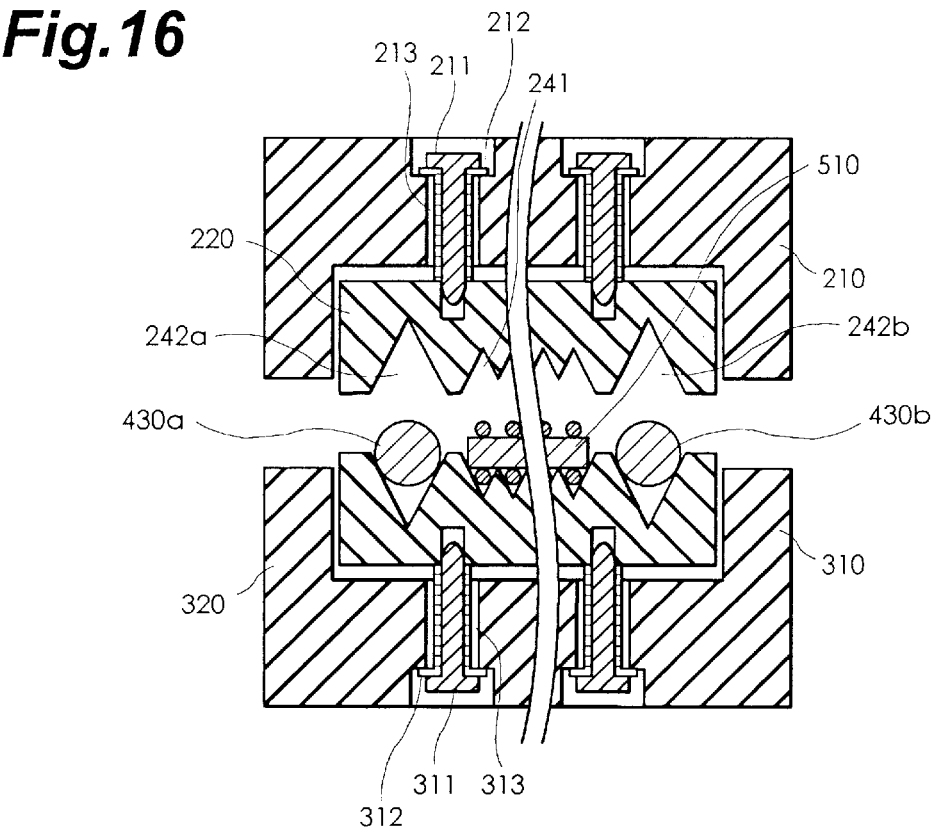

The upper die body 210 accommodating the upper die metal block 220 in its recessed portion is placed on the lower die body 310. The respective lower core pins 420 are supported each at two points by the positioning mechanism portion 341 of the upper die metal block 220. The respective guide hole formation pins 430a and 430b are supported by the positioning mechanism portions 242a and 242b, and 243a and 243b of the upper die metal block 220 (see FIG. 16).

Figure 17:
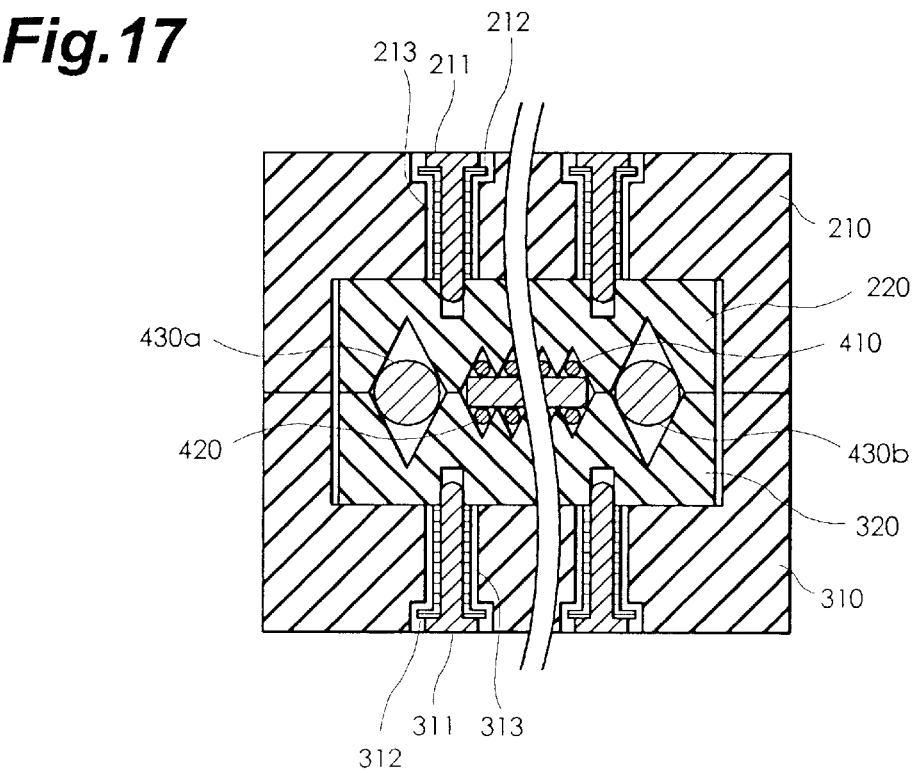
Figure 18:
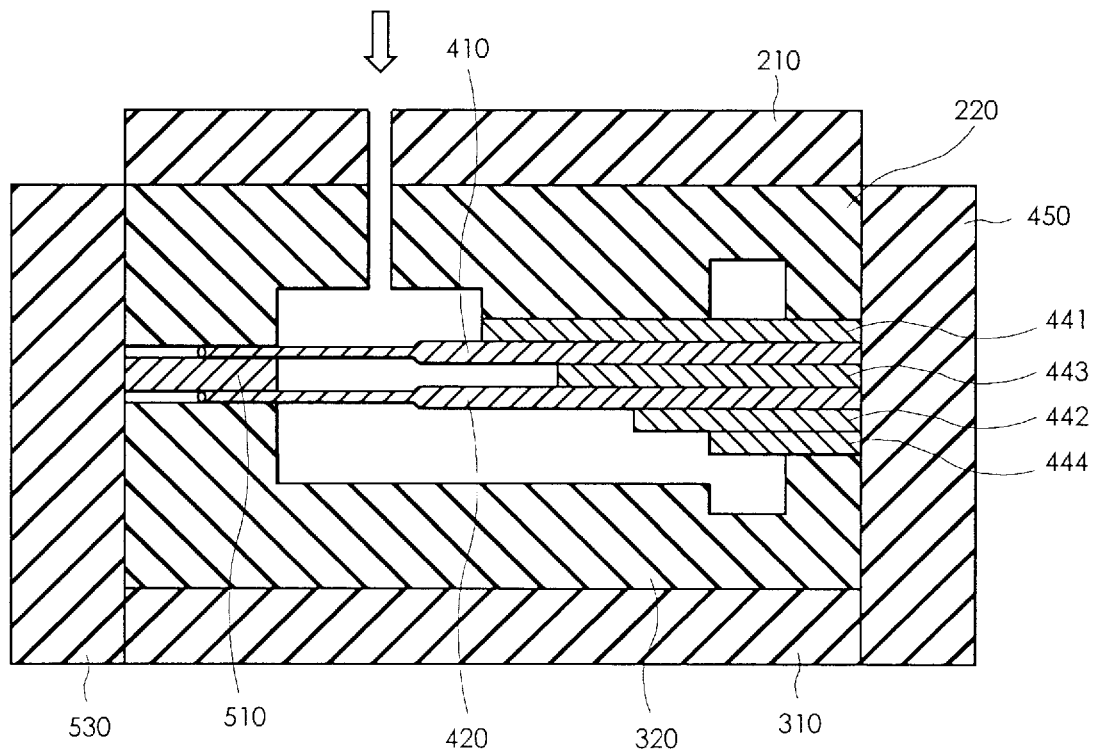

Subsequently, the major surface 222 of the upper die metal block 220 and the major surface 322 of the lower die metal block 320 are brought into tight contact with each other, and the upper and lower die bodies 210 and 310 are fixed (see FIGS. 17 and 18).

While the upper and lower die bodies 210 and 310 are clamped until the gap between them disappears, i.e., until the upper die metal block 220 and the upper die body 210 come in direct contact with each other and the lower die metal block 320 and the upper and lower die body 310 come in direct contact with each other, the upper and lower die metal blocks 220 and 320 float from the upper and lower die bodies 210 and 310, respectively. When the upper and lower die metal blocks 220 and 320 are positioned by the respective positioning mechanism portions in accordance with the positions of the corresponding pins, the opposing positioning mechanism portions are highly precisely aligned with each other by the upper and lower die metal blocks 220 and 320.

If the gap formed between the upper die body 210 and the upper die metal block 220 is small and the gap formed between the lower die body 310 and the lower die metal block 320 is small, when the die is heated to the molding temperature, the gaps can sometimes disappear by thermal expansion. In order to prevent this, the gaps are preferably set to 5 $\mu$m or more, and more preferably 10 $\mu$m or more. If the gaps become 200 $\mu$m or larger than this, the injected molding resin may flow into these gaps. From these reasons, it is preferable that the gaps be set to 5 $\mu$m to 200 $\mu$m.

After clamping, i.e., while the cavity for forming the ferrule 100 is constituted, the distance between the line connecting the centers of the pins of the upper core and the line connecting the centers of the pins of the lower core is preferably 0.3 to 1.0 mm. If this distance is smaller than 0.3 mm, judging from the working precision of the spacer 510, the spacer 510 is likely to warp; if larger than 1.0 mm, the coupling characteristics as the optical connector tend to degrade. It is more preferable that the distance between the line connecting the centers of the pins of the upper core and the line connecting the centers of the pins of the lower core be 0.4 to 0.7 mm.

Figure 19:
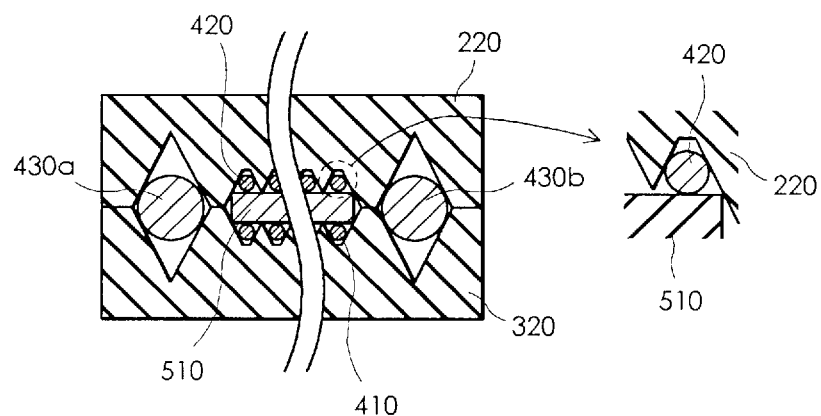
FIGS. 19 to 23 are views for explaining modifications of a pin positioning mechanism portion.
Figure 20:
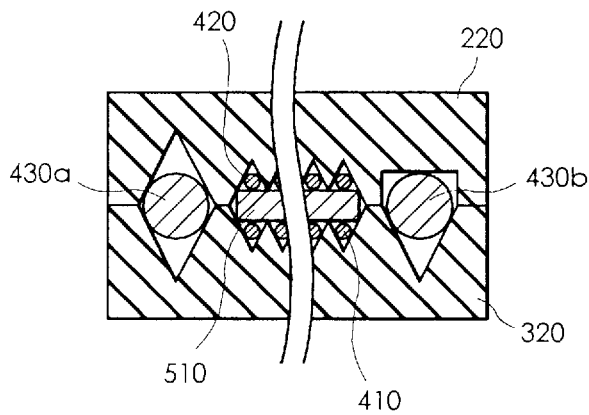
Figure 21:
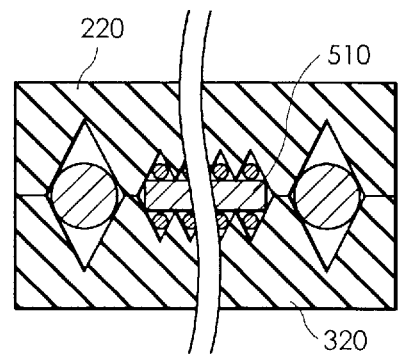
Figure 22:
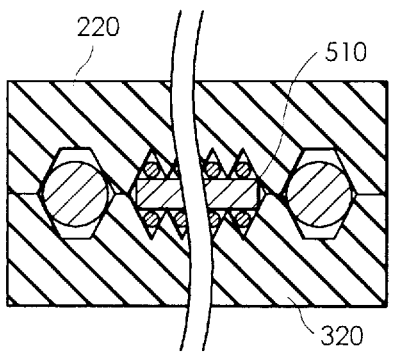
Figure 23:
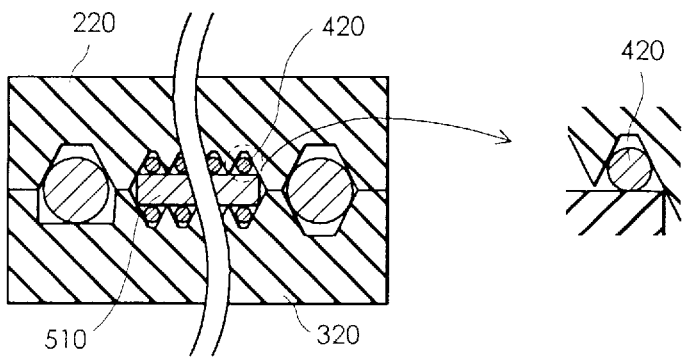
Figure 24:
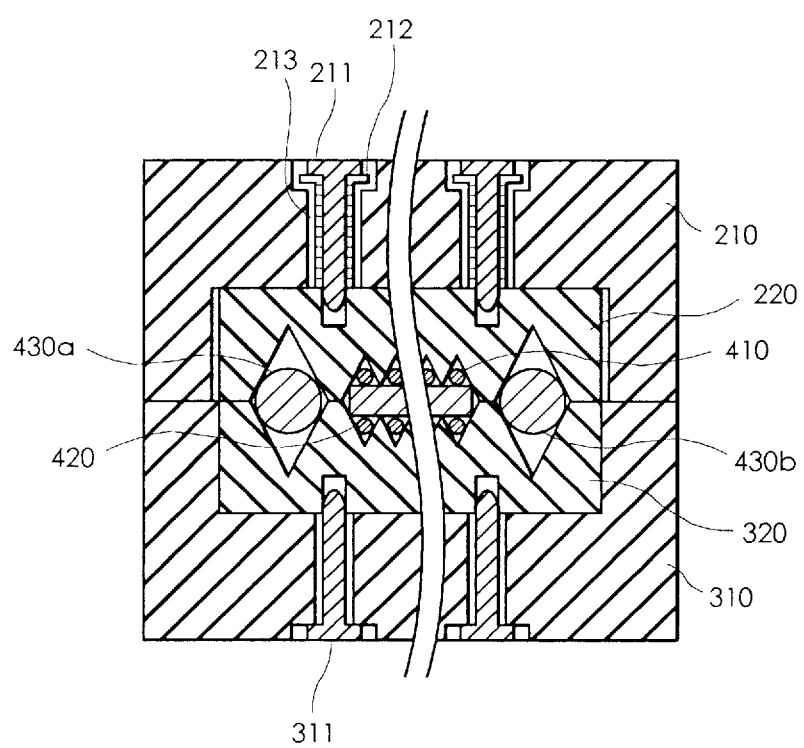
FIG. 24 is a view for explaining a modification of the die.

In this embodiment, in holding the upper and lower core pins 410 and 420, the positioning mechanism portions 241 and 341 employ the V-groove structure so that they support the core pins 410 and 420 each at 2 points both on the upper and lower sides. However, the positioning mechanism portions 241 and 341 may employ a trapezoidal groove structure, as shown in FIG. 19. Also, one of the positioning mechanism portions 241 and 341 may employ the V-groove structure, while the other one employs the trapezoidal groove structure.

In this embodiment, in holding the guide hole formation pins 430a and 430b, the positioning mechanism portions 242a and 242b, and 243a and 243b, and the positioning mechanism portions 342a and 342b, and 343a and 343b employ the V-groove structure, so that they support the pins 430a and 430b each at 2 points both on the upper and lower sides. However, a trapezoidal groove structure may be employed as the structure for 2-point supporting, so that the V-groove structure and the trapezoidal groove structure are mixed. It is not necessary to employ the 2-point supporting structure for all the positioning mechanism portions. If one of a pair of positioning portions employs the 2-point supporting structure, the other may employ a 1-point supporting structure (see FIGS. 20 to 23).

Figure 25:
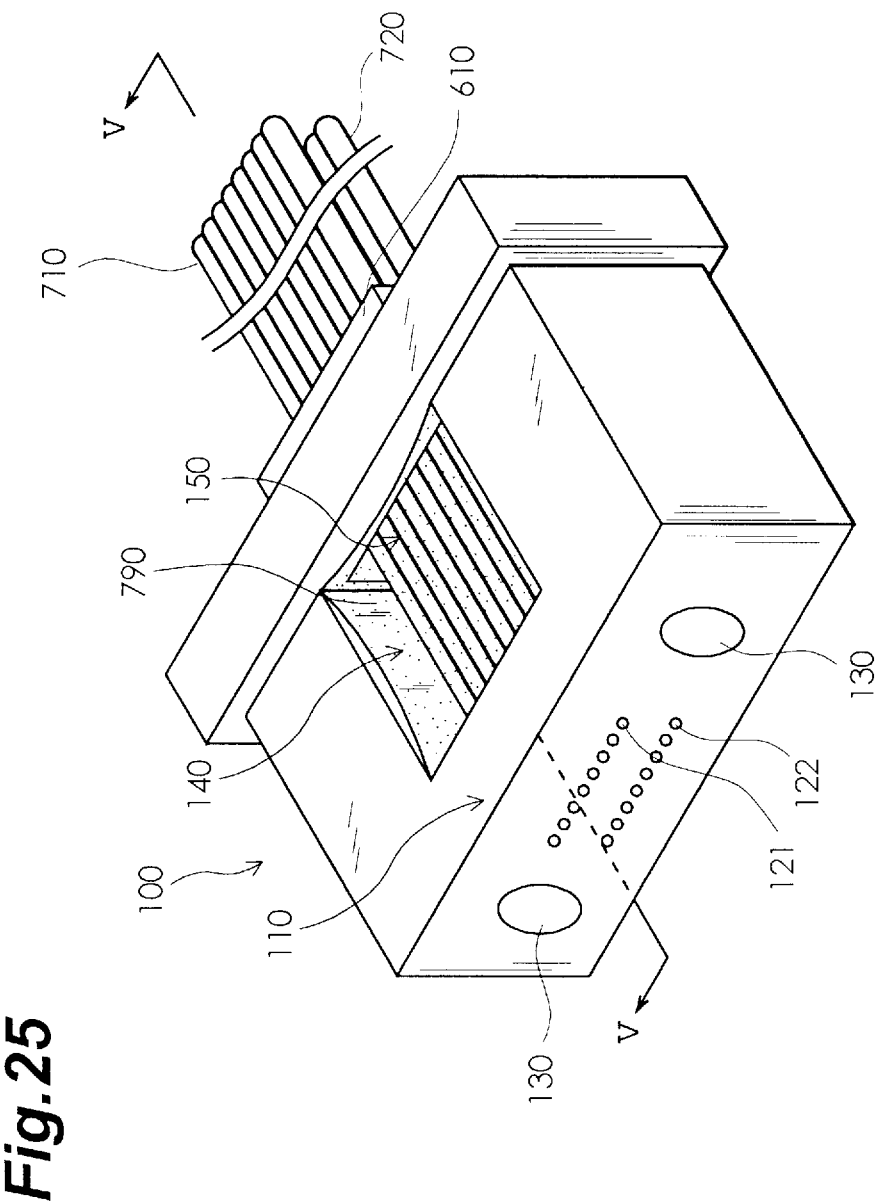
FIG. 25 is a perspective view showing the outer appearance of the structure of an optical connector with optical fibers of this embodiment.

In this embodiment, both the upper and lower die metal blocks 220 and 320 float from the upper and lower die bodies 210 and 310, respectively. However, as shown in FIG. 25, the upper die metal block 220 may float from the upper die body 210, and the lower die metal block 320 may be fixed to the lower die body 310. In this case as well, the opposing positioning mechanisms formed in the upper and lower die metal blocks 220 and 320 can be aligned with each other highly precisely. While the upper die metal block 220 is fixed to the upper die body 210, even if the lower die metal block 320 floats from the lower die body 310, the same effect can be obtained.

A resin is injected into the cavity formed by the recessed portions 230 and 330 of the upper and lower die metal blocks 220 and 320, respectively, to form the ferrule by resin molding. As this resin molding, either transfer molding or injection molding can be employed.

After the resin injected into the cavity solidifies, the upper and lower core pins 410 and 420, the guide hole formation pins 430a and 430b, the spacer 510, and the positioning pins 520a and 520b are extracted.

The upper and lower die bodies 210 and 310 are separated from each other, and the upper and lower die metal blocks 220 and 320 are separated from each other, thus obtaining the optical connector ferrule 100 formed with the resin.

Figure 26:
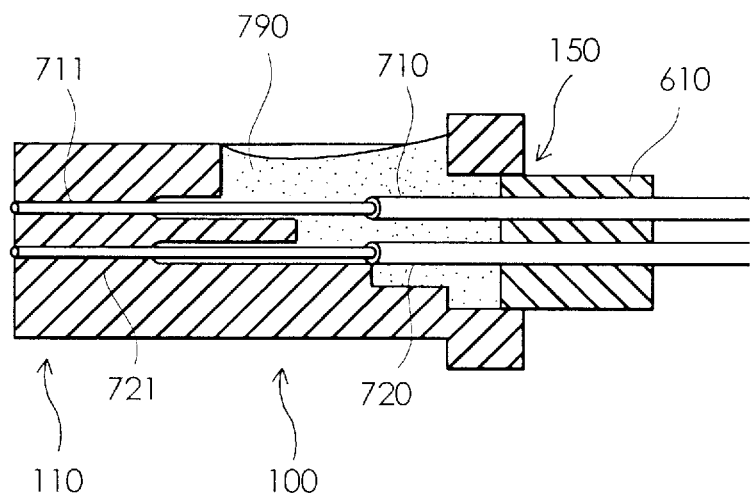
FIG. 26 is a sectional view of the optical connector shown in FIG. 25 taken along the line V—V thereof.

FIGS. 25 and 26 show the structure of an optical connector with optical fibers which utilizes the optical connector ferrule 100 of the present invention, in which FIG. 25 is a perspective view showing the outer appearance of the structure of this optical connector ferrule 100, and FIG. 26 is a sectional view of the optical connector shown in FIG. 25 taken along the line V—V thereof.

As shown in FIGS. 25 and 26, this optical connector has (a) the optical connector ferrule 100 shown in FIG. 1, (b) an optical fiber tape 710, (c) an optical fiber tape 720, and (d) a rubber boot 610. A bare optical fiber portion 711 at the distal end portion of the optical fiber tape 710 is held by the upper through holes 121 of the holding portion 110 of the ferrule 100, and the optical fiber tape 710 is adhered and fixed to the ferrule 100 in the space in the optical fiber tape accommodating portion 140 of the ferrule 100 with an adhesive 790. A bare optical fiber portion 721 at the distal end portion of the optical fiber tape 720 is held by the through holes 122 of the holding portion 110 of the ferrule 100, and the optical fiber tape 720 is adhered and fixed to the ferrule 100 in the space in the optical fiber tape accommodating portion 140 of the ferrule 100 with the adhesive. At the insertion opening 150 of the ferrule 100, the rubber boot 610 serves as a filling member which substantially fills the insertion opening 150 together with the optical fiber tapes 710 and 720.

As shown in FIG. 26, the rubber boot 610 covers the optical fiber tapes 710 and 720, and also serves as a spacer between them.

Figure 27:
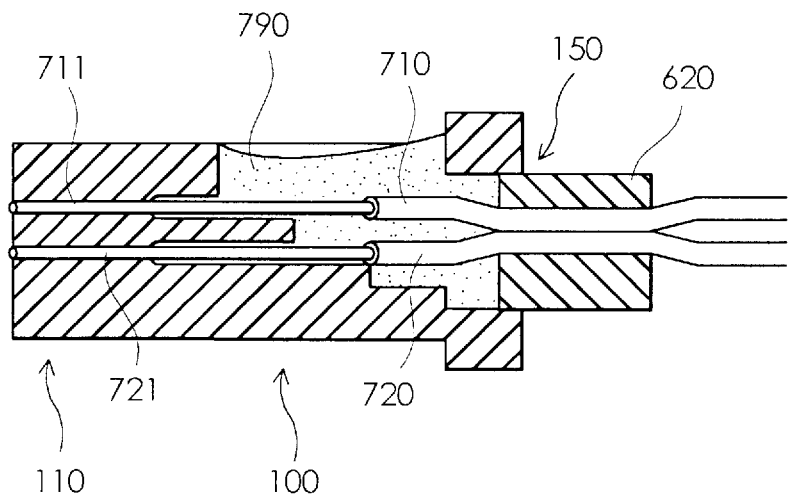
FIGS. 27 and 28 are views for explaining modifications of the optical connector with optical fibers.

As the filling member rubber, a boot 620 which covers optical fiber tapes 710 and 720 but does not serve as a spacer between them, as shown in FIG. 27, can be employed.

Figure 28:
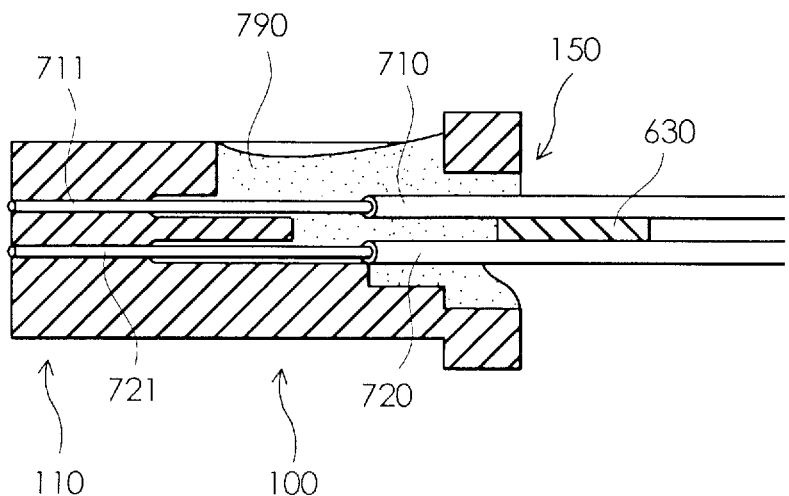

Alternatively, a spacer member 630 between optical fiber tapes 710 and 720, as shown in FIG. 28, can also be employed as the filling member.

When such a filling member is employed, the optical fiber tapes 710 and 720 can be prevented from being adhered to each other over a long distance in the longitudinal direction, so that the degree of freedom of the optical fiber tapes 710 and 720 can be ensured.

The thickness of the spacer member 630 is preferably equal to or smaller than the thickness of the optical fiber tapes 710 and 720. With this size, when the optical connectors are to be coupled to each other with a coupling clip, the pawl of the coupling clip will not be caught by the spacer member 630 and disconnection of the optical fiber tapes 710 and 720 can be prevented.

Also, the thickness of the spacer member 630 is preferably smaller than the distance between the central lines of the rows of the through holes 121 and 122 of the ferrule 100, i.e., smaller than the stacking pitch of the optical fiber tapes. With this size, local bending of the optical fiber tapes 710 and 720 at the insertion opening 150, which is caused by the thickness of the spacer member 630, can be decreased in the ferrule 100, thus decreasing degradation in transmission characteristics.

The ability of the spacer member 630 to prevent flow-out of the adhesive depends on the size of the optical fiber tape insertion opening. Usually, if the thickness of the spacer member is 0.2 mm or more, the spacer member can sufficiently exhibit its flow-out prevention ability.

A method of manufacturing the optical connector of this embodiment will be described with reference to FIGS. 29 to 37.

Figure 29:
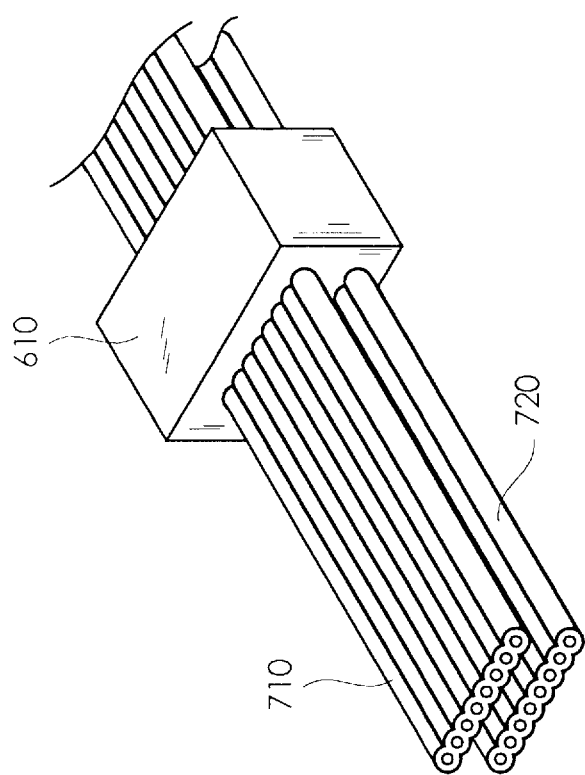
Figure 34:
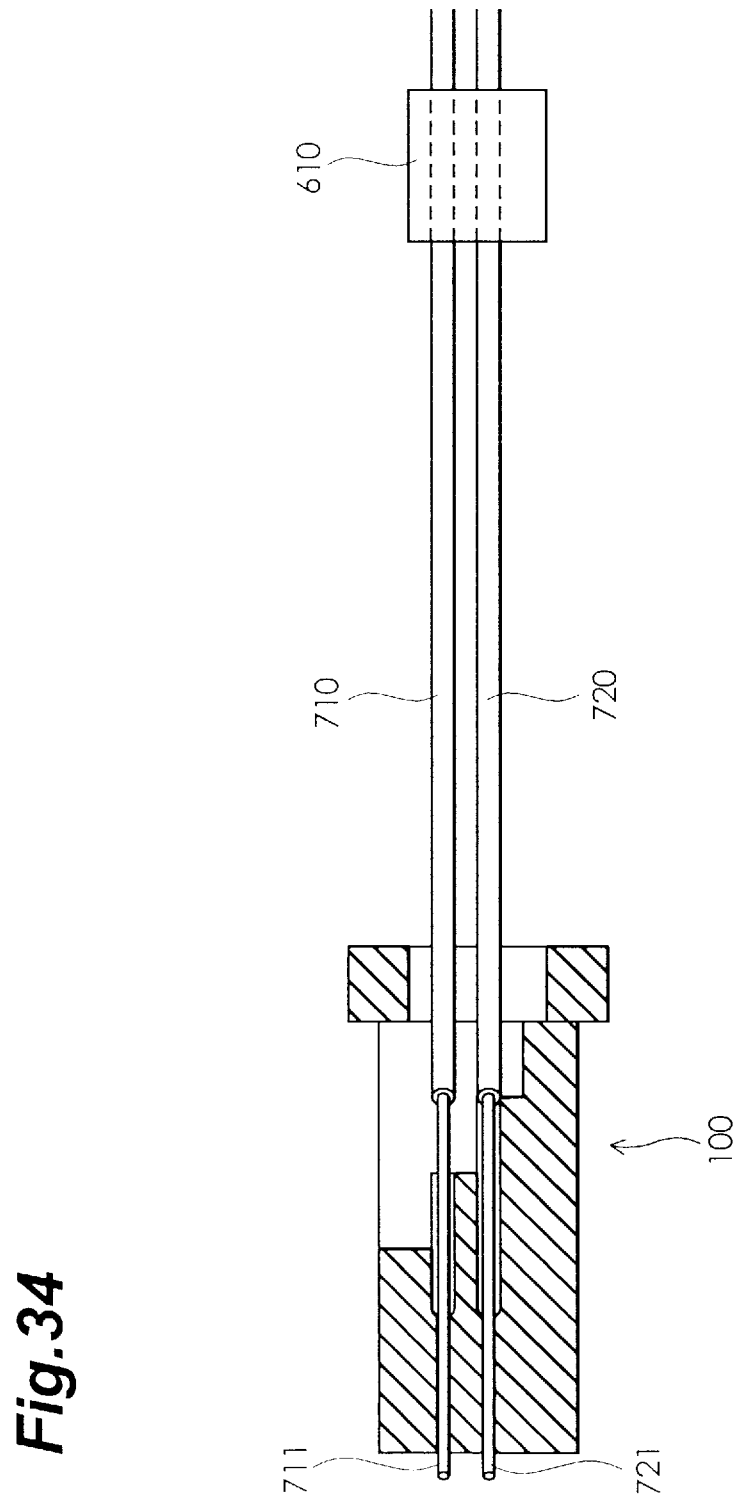

First, the optical fiber tapes 710 and 720 are inserted through the rubber boot 610 (see FIG. 29). Successively, the coatings at the distal end portions of the optical fiber tapes 710 and 720 are removed to expose the bare optical fiber portions 711 and 721 (see FIG. 30).

The bare optical fiber portion 721 at the distal end portion of the optical fiber tape 720 is inserted in the ferrule 100 through the insertion opening 150, and is further inserted into the through holes 122 along the guide grooves 162 (see FIG. 31). Insertion is continued until the bare optical fiber portion 721 projects from the through holes 122 (see FIG. 32).

The bare optical fiber portion 711 at the distal end portion of the optical fiber tape 710 is inserted in the ferrule 100 through the insertion opening 150, and is further inserted into the through holes 121 along the guide grooves 161 (see FIG. 33). Insertion is continued until the bare optical fiber portion 711 projects from the through holes 121 (see FIG. 34).

Figure 35:
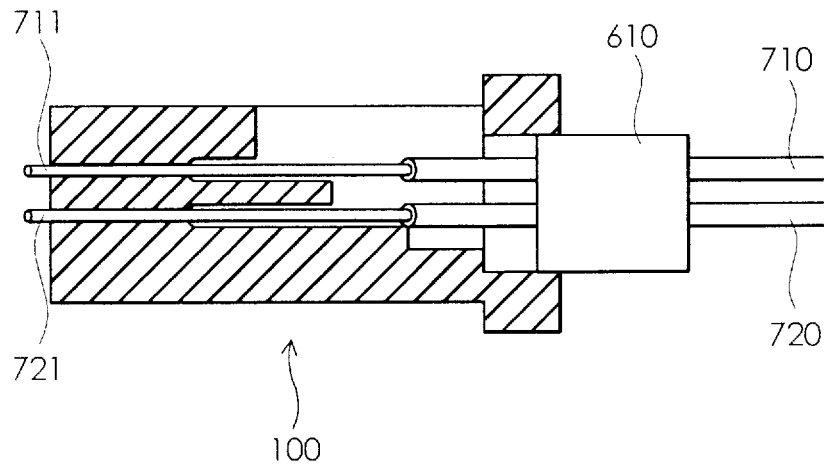
Figure 36:
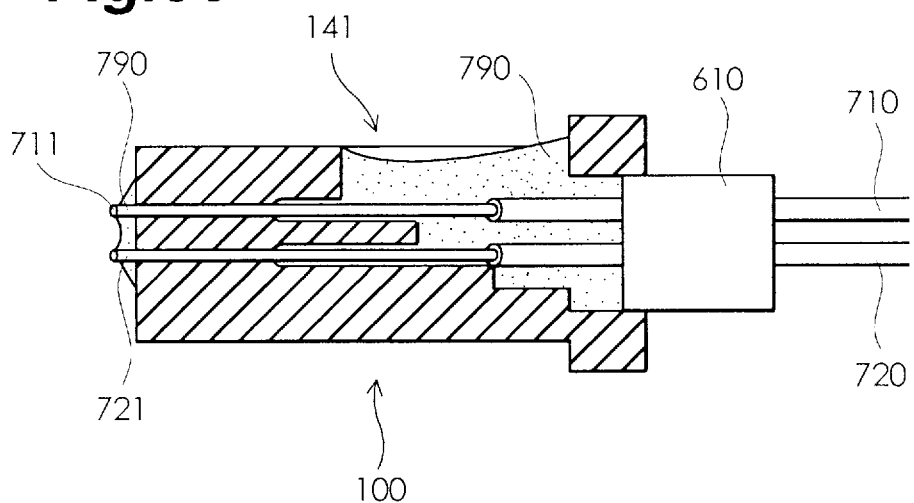
Figure 37:
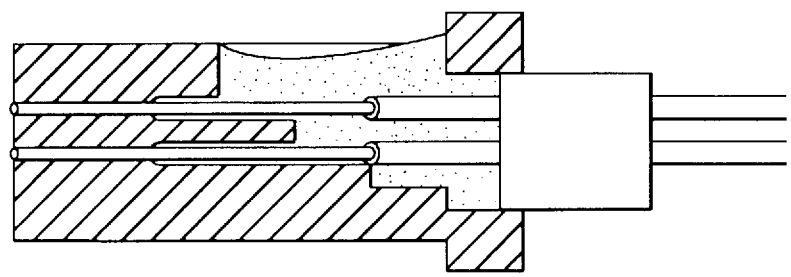

The rubber boot 610 is moved to be inserted into the ferrule 100 through the insertion opening 150 (see FIG. 35). The adhesive 790 is injected through the adhesive injection opening 141 to fill the space in the ferrule 100. Also, the adhesive 790 is applied to a front surface 115 of the ferrule 100 and the outer surfaces of the projecting bare optical fiber portions 711 and 712 (see FIG. 36).

After the adhesive 790 solidifies, the portions of the bare optical fiber portions 711 and 712 projecting from the front surface 115 are removed by abrasion to obtain the optical connector with optical fibers of this embodiment.

As has been described above, according to the present invention, an optical connector ferrule as an indispensable component for a connector with optical fibers in which optical fibers are arranged with an increased density can be obtained, and an optical connector with optical fibers in which optical fibers are arranged with an increased density can be realized.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 128720/1996 filed on May 23, 1996, No. 157452/1996 filed on May 30, 1996, No. 166611/1996 filed on Jun. 7, 1996, and No. 192748/1996 filed on Jul. 4, 1996 are hereby incorporated by reference.

What is claimed is:

1. An optical connector ferrule comprising:

a holding portion arranged at a position along an inserting direction of optical fibers to constitute a front surface of said ferrule and having a plurality of first through holes for inserting said optical fibers therethrough and two second through holes for inserting guide pins, said holding portion holding portions of said optical fibers near distal ends thereof, the second through holes and the first through holes having central axes that are substantially parallel to each other, and the first through holes being arrayed in two rows in a direction connecting centers of the second through holes; and an optical fiber tape accommodating portion having an insertion opening for inserting therethrough optical fiber tapes having said optical fibers held by said holding portion, an internal space for partially accommodating said optical fiber tapes, and an injection opening for injecting therethrough an adhesive for adhering and fixing said inserted optical fiber tapes and said ferrule with each other, wherein said optical connector ferrule is formed integrally by resin molding.

2. A ferrule according to claim 1, wherein the first through holes are arrayed point-symmetrically about a middle point connecting the centers of the second through holes.

3. A die for forming an optical connector ferrule, comprising:

an upper die metal block and a lower die metal block respectively having recessed portions formed to have predetermined shapes so as to constitute a cavity for forming an optical connector ferrule when major surfaces of said upper and lower die metal blocks are brought into tight contact with each other to sandwich upper core pins and lower core pins arrayed in two rows to form first through holes for optical fiber insertion, a spacer arranged between the rows of said upper and lower core pins, and two guide hole formation pins for forming second through holes guide pin insertion, the rows of said upper and lower core pins being arrayed between said two guide hole formation pins when said cavity for forming said optical connector ferrule is constituted, wherein said upper die metal block has a first positioning mechanism portion for positioning said upper core pins and a second positioning mechanism portion for positioning an upper side of said guide hole formation pins, and said lower die metal block has a third positioning mechanism portion for positioning said lower core pins and a fourth positioning mechanism portion for positioning a lower side of said guide hole formation pins.

4. A die according to claim 3, wherein said first positioning mechanism portion has positioning portions, respectively, for said upper core pins, with such a section along a plane perpendicular to an inserting direction of said upper core pins as to support said upper core pins at two points, and said third positioning mechanism portion has positioning portions, respectively, for said lower core pins, with such a section along the plane perpendicular to the inserting direction of said upper core pins as to support said upper core pins at two points.

5. A die according to claim 3, wherein said second positioning mechanism portion has positioning portions, respectively, for said guide hole formation pins, with such a section along a plane perpendicular to an inserting direction of said guide pins as to support said guide hole formation pins at two points, and said fourth positioning mechanism portion has positioning portions, respectively, for said guide hole formation pins, with such a section along the plane perpendicular to the inserting direction of said guide pins as to support said guide hole formation pins at two points.

6. A die according to claim 3, wherein said second positioning mechanism portion has positioning portions, respectively, for said guide hole formation pins, with such a section along a plane perpendicular to an inserting direction of said guide pins as to support said guide hole formation pins at two points, said fourth positioning mechanism portion has a positioning portion, for a first one of said guide hole formation pins, with such a section along the plane perpendicular to the inserting direction of said guide pins as to support said first guide hole formation pin at two points, and said fourth positioning mechanism portion has a positioning portion, for a second one of said second guide hole formation pins, with such a section along the plane perpendicular to the inserting direction of said guide pins as to support said second guide hole formation pin at one point on a plane parallel to a direction connecting centers of said guide hole formation pins.

7. A die according to claim 3, wherein said second positioning mechanism portion has a positioning portion, for a first one of said first guide hole formation pins, with such a section in a plane perpendicular to an inserting direction of said guide pins as to support said first guide hole formation pin at two points, said second positioning mechanism portion has a positioning portions, for a second one of said first guide hole formation pins, with such a section along the plane perpendicular to the inserting direction of said guide pins as to support said second guide hole formation pin at one point on a plane parallel to a direction connecting centers of said guide hole formation pins, and said fourth positioning mechanism portion has positioning portions, respectively, for said guide hole formation pins, with such a section along the plane perpendicular to the inserting direction of said guide pins as to support said guide hole formation pins at two points.

8. A die according to claim 3, wherein when said cavity for forming said optical connector ferrule is constituted, a distance between a line connecting centers of said upper core pins and a line connecting centers of said lower core pins is 0.3 mm to 1.0 mm.

9. A die according to claim 3, further comprising:

an upper die body having a recessed portion to accommodate said upper die metal block; and a lower die body having a recessed portion to accommodate said lower die metal block.

10. A die according to claim 9, wherein when said upper die metal block is placed on a central portion of a bottom surface of said recessed portion of said upper die body such that a bottom surface thereof comes into tight contact with said bottom surface of said recessed portion of said upper die body, a distance between a side surface of said recessed portion of said upper die body and a side surface of said upper die metal block which opposes said side surface of said recessed portion of said upper die body is 5 $\mu$m to 200 $\mu$m.

11. A die according to claim 10, further comprising:

a coupling member extending through a coupling through hole between an outer circumferential surface of said upper die body, which opposes said bottom surface of said recessed portion of said upper die body, and said bottom surface of said recessed portion of said upper die body, to indirectly couple said upper die metal block and said upper die body with each other, said coupling member being longer than the coupling through hole, and having a first portion having an outer diameter smaller than a diameter of the coupling through hole by 5 $\mu$m to 200 $\mu$m and a second portion having a diameter larger than that of the first coupling through hole to serve as an outer side of said outer circumferential surface of said upper die body, and said coupling member being fixed to said upper die block.

12. A die according to claim 11, wherein said upper die body is formed with a plurality of coupling through holes each having said coupling member.

13. A die according to claim 9, wherein when said lower die metal block is placed on a central portion of a bottom surface of said recessed portion of said lower die body such that a bottom surface thereof comes into tight contact with said bottom surface of said recessed portion of said lower die body, a distance between a side surface of said recessed portion of said lower die body and a side surface of said lower die metal block which opposes said side surface of said recessed portion of said lower die body is 5 $\mu$m to 200 $\mu$m.

14. A die according to claim 13, further comprising:

a coupling member extending through a coupling through hole between an outer circumferential surface of said lower die body, which opposes said bottom surface of said recessed portion of said lower die body, and said bottom surface of said recessed portion of said lower die body, to indirectly couple said lower die metal block and said lower die body with each other, said coupling member being longer than the coupling through hole, and having a first portion having an outer diameter smaller than a diameter of the coupling through hole by 5 $\mu$m to 200 $\mu$m and a second portion having a diameter larger than that of the coupling through hole to serve as an outer side of said outer circumferential surface of said lower die body, and said coupling member being fixed to said upper die block.

15. A die according to claim 14, wherein said lower die body is formed with a plurality of coupling through holes each having said coupling member.

16. A method of manufacturing said optical connector ferrule according to claim 1 by utilizing said die according to claim 3, comprising:

the first step of supporting said lower core pins each at two points by said third positioning mechanism portion of said lower die metal block accommodated in said recessed portion of said lower die body and supporting said guide hole formation pins by said fourth positioning mechanism portion of said lower die metal block, said upper core pins, said lower core pins, and said guide hole formation pins being held by a pin holding member;

the second step of inserting said spacer between the row of said upper core pins and the row of said lower core pins;

the third step of placing said upper die metal block accommodating said upper die metal block in said recessed portion thereof on said lower die body, supporting said upper core pins, each at two points, by said first positioning mechanism portion of said upper die metal block, and supporting said guide hole formation pins by said second positioning mechanism portion of said upper die metal block;

the fourth step of bringing a major surface of said upper die metal block and a major surface of said lower die metal block into tight contact with each other and fixing said upper die body and said lower die body;

the fifth step of injecting a resin into a cavity formed by said recessed portion of said upper die metal block and said recessed portion of said lower die metal block, thereby resin-molding said ferrule;

the sixth step of extracting, after the resin injected in said cavity solidifies, said upper core pins, said lower core pins, said guide hole formation pins, and said spacer; and the seventh step of separating said upper and lower die bodies from each other and said upper and lower die metal blocks from each other, thereby obtaining an optical connector ferrule which is resin-molded.

17. A method according to claim 16, wherein resin molding is performed in accordance with either one of transfer molding and injection molding.

18. A method according to claim 16, wherein said upper core pins, said lower core pins, and said guide hole formation pins have distal end portions that are tapered.

19. A method according to claim 18, wherein said spacer is made of a material having a hardness smaller than both a hardness of a material of said upper core pins and a hardness of a material of said lower core pins.

20. A method according to claim 16, wherein said spacer is held, together with two spacer positioning pins serving to determine an inserting position of said spacer, by a spacer holding member, in the second step, said spacer positioning pins are supported by said fourth positioning mechanism portion of said lower die metal block, and in the third step, said spacer positioning pins are supported by said second positioning mechanism portion of said upper die metal block.

21. An optical connector with optical fibers, comprising:

said optical connector ferrule according to claim 1;

a first optical fiber tape having a bare optical fiber portion at a distal end portion thereof which is held by the first through holes of the first row of a holding portion of said ferrule, said first optical fiber tape being adhered and fixed to said ferrule in the internal space of said optical fiber tape accommodating portion of said ferrule; and a second optical fiber tape having a bare optical fiber portion at a distal end portion thereof which is held by the first through holes of the second row of said holding portion of said ferrule, said second optical fiber tape being adhered and fixed to said ferrule in the internal space of said optical fiber tape accommodating portion of said ferrule.

22. A connector according to claim 21, further comprising, at an insertion opening portion of said ferrule, a filling member for substantially filling an insertion opening together with said first and second optical fiber tapes.

23. A connector according to claim 22, wherein said filling member comprises a spacer disposed between said first and second optical fiber tapes near the insertion opening of said ferrule.

24. A connector according to claim 23, wherein said spacer has a thickness not more than a smaller one of a thickness of said first optical fiber tape and a thickness of said second optical fiber tape.

25. A connector according to claim 23, wherein said spacer has a thickness smaller than a distance between a line connecting centers of the first through holes of the first row of said ferrule and a line connecting centers of the first through holes of the second row of said ferrule.

26. A connector according to claim 24, wherein the thickness of said spacer is not less than 0.2 mm.

27. A connector according to claim 22, further comprising an optical fiber tape holding member which holds said first and second optical fiber tapes and which is held by said insertion opening portion of said ferrule.

* * * * *